(12) United States Patent
Kerscher et al.

(10) Patent No.: US 6,288,190 B1
(45) Date of Patent: Sep. 11, 2001

(54) MATERIALS WHICH CAN BE THERMALLY COATED WITH A POLYMERIZABLE COMPONENT

(75) Inventors: Volker Kerscher, Darmstadt; Thomas Suefke, Erzhausen, both of (DE)

(73) Assignee: Roehm GmbH, Darmstadt (DE)

( * ) Notice: Subject to any disclaimer, the term of this patent is extended or adjusted under 35 U.S.C. 154(b) by 0 days.

(21) Appl. No.: 09/508,112

(22) PCT Filed: Sep. 16, 1998

(86) PCT No.: PCT/EP98/05880

§ 371 Date: May 8, 2000

§ 102(e) Date: May 8, 2000

(87) PCT Pub. No.: WO99/15592

PCT Pub. Date: Apr. 1, 1999

(30) Foreign Application Priority Data

Sep. 20, 1997 (DE) ............................................ 197 41 614
Jun. 19, 1998 (DE) ............................................ 198 27 384

(51) Int. Cl.[7] ........................ C08F 220/10; C08F 265/06; C08F 257/02; B05D 3/02

(52) U.S. Cl. ................................. 526/318.4; 526/318.41; 526/325; 526/309; 526/329.7; 525/193; 525/301; 525/309; 525/451; 427/384; 427/388.1; 427/389.9

(58) Field of Search ............................. 526/318.4, 318.41, 526/325, 309, 329.7; 525/193, 301, 309, 451

(56) References Cited

U.S. PATENT DOCUMENTS 4,223,115 * 9/1980 Zalucha et al. ...................... 525/455

FOREIGN PATENT DOCUMENTS 38 40 955 * 6/1990 (DE) .
0 442 178 * 8/1991 (EP) .

* cited by examiner

Primary Examiner—James J. Seidleck
Assistant Examiner—Olga Asinovsky
(74) Attorney, Agent, or Firm—Oblon, Spivak, McClelland, Maier & Neustadt, P.C.

(57) ABSTRACT

The invention relates to reactive polysols with a reactive monomer portion which is polymerized during thermal coating. The polysols exhibit good mechanical properties. A monofunctional (meth)acrylate monomer of formula (1) is used as reactive monomer component.

19 Claims, No Drawings

MATERIALS WHICH CAN BE THERMALLY COATED WITH A POLYMERIZABLE COMPONENT

BACKGROUND OF THE INVENTION

1. Field of the Invention

This invention relates to so-called reactive plastisols, i.e. thermally film-forming polymers based on (meth)carylates and/or styrene that contain a low molecular weight or oligomeric plasticizer and a reactive monomer component.

2. Description of the Background

Plastisols are suspensions or dispersions of finely divided polymer particles in certain liquid.

STATE OF THE ART

Plastisols are suspensions or dispersions of finely divided polymer particles in certain liquid organic media, so-called plasticizers. The polymer particles microdispersed in the plasticizer phase at room temperature form a paste at room temperature. However, they melt in a "gelling process" typical of plastisol processing, usually at temperatures>100° C., ordinarily>150° C., and form a homogeneous plastic matrix with the plasticizer being absorbed by the polymers.

Typical representatives of thermoplastic finely divided synthetics for the preparation of plastisols are:
Polyvinyl chloride (PVC)
Polymethyl methacrylate (PMMA)
Polyalkyl methacrylate (PAMA), e.g. Polymethyl methacrylate copolymers
Polyvinyl chloride copolymers (PVC/PVAc)

Plastisols based on PVC are widely used because of their desirable practical properties (mechanical strength, adhesion to substrates, etc.), especially in the coatings sector. (Cf. Kunststoff-Handbuch [*Plastics Manual*], 2nd Edition, Ed. H. K. Felger, Vol. 2/2, pp. 1077–1124; 854–869, Hanser-Verlag 1985).

Plastisols with beneficial properties based on poly(meth) acrylate have also been developed recently as so-called PAMA plastisols (DE-A 24 54 235, U.S. Pat. No. 4,071,653; DE-A 40 30 080, U.S. Pat. No. 5,120,795).

Esters of phthalic acid, citric acid esters, and also oligomeric compounds are known as plasticizers.

The stability of the pastes formed of plasticizer and polymer at storage temperature is characteristic of plastisols. The standard here is usually >30 days. After application to the substrate to be coated, thermal filming is usually brought about within a few minutes by heating to >150° C.

It is also known how to add a polymerizable crosslinking compound such as a (meth)acrylic ester of a polyfunctional alcohol, for example trimethylolpropane trimethacrylate, to the plastisols to impart adhesion to metallic substrates and to modify strength and hardness. However, the amounts of such additives that can be used are limited since when large amounts are added, for example more than 5 wt. %, there is severe embrittlement of the gelled coating composition.

The reason for this effect lies in the crosslinking nature of the compounds added. Polymerization of such additives occurs by thermal polymerization at the same time as the physical gelling upon heating. The dissociation properties of the initiators added are matched to the gelling temperature used.

DE-PS 25 43 542 (Röhm GmbH) describes a method for producing a plastisol by emulsion polymerization of a monomeric mixture of methyl methacrylate, monomers with a basic nitrogen atom, and other monomers copolymerizable with them. The composition differs from the plastisols pursuant to this invention by the presence of monomers with a basic nitrogen atom.

U.S. Pat. No. 5,298,542 (Nippon Ceon Coop.) describes acrylic ester plastisol compositions. In this case also, the special monomer of the invention as described in Component (B) is not mentioned.

U.S. Pat. No. 5,324,762 (ICI) describes a plastisol from mixtures of methyl methacrylate and isobutyl methacrylate copolymers. Other monomeric components, for example isobornyl methacrylate, and their specific advantages, are not disclosed.

Drawbacks of the plastisols of the state of the art that have been recorded in particular are.

PROBLEM AND SOLUTION

Drawbacks of the plastisols of the state of the art that have been recorded in particular are their deficient hardness and abrasion resistance, which are correlated directly with their high plasticizer content, nominally about 60 wt. %. This drawback also applies particularly to polyalkyl (meth) acrylate plastisols. Raising the solids content with the intention of achieving improved mechanical characteristics, however, is opposed by the severely elevated viscosity of high-solids plastisols.

The problem therefore existed of making available plastisols based on polyalkyl (meth)acrylate with improved practical properties, especially improved mechanical properties and adequate storage stability.

SUMMARY OF THE INVENTION

It has now been found that this invention solves this problem to a great extent, especially.

It has now been found that this invention solves this problem to a great extent, especially since it permits a wide range of variation in setting the plasticizer content, and with it the mechanical properties, without viscosity problems becoming important. It is surprising that storage stability is not impaired in spite of the high percentage of reactive monomers. The term "Reactive Plastisols" is proposed for the object of this invention for immediately understandable reasons.

This invention thus relates to reactive plastisols containing

DETAILED DESCRIPTION OF THE PREFERRED EMBODIMENTS

This invention thus relates to reactive plastisols containing:

(A) Thermally film-forming polymers P as the base polymer for plastisols, especially polystyrene and polyvinyl esters, copolymers or poly(meth)acrylic esters, in particular dispersed poly(meth)acrylic esters P-M, preferably in the form of a spray-dried emulsion polymer, (B) a reactive monomeric component consisting of at least one monofunctional (meth)acrylate monomer RM, especially one with a molecular weight of >150 Daltons, (C) at least one low molecular weight or oligomeric plasticizer W compatible with the thermally film-forming polymer, (D) optionally other crosslinking monomers VM, (E) optionally conventional fillers, pigments, and auxiliaries.

As already described above, thermally film-forming polymers P in themselves are known as base polymers for plastisols. This invention is especially important with regard to the so-called PAMA plastisols formed from poly(meth)acrylic esters P-M. The polymeric component is preferably in dispersed form, especially in the form of a spray-dried emulsion polymer.

Component (A)

The principal monomeric component of the thermally film-forming polymer P is methyl methacrylate or styrene, which as a rule amounts to more than 60 wt. %, especially >70 wt. %, and preferably 80–99 wt. % based on P-M.

A content of 0–20 wt. % of polar comonomers based on P-M is also preferred. Polar comonomers that may be mentioned in particular are those that contain nitrogen and/or oxygen heteroatoms, or less preferably sulfur, particularly when they have hydrogen bonded to them at the same time.

The polar comonomers preferably consist of compounds with Formula II

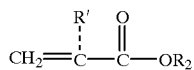

(II)

wherein
R' stands for hydrogen or methyl, and
$R_1$ stands for —OH or —$NHR_2$, wherein $R_2$ stands for hydrogen or an alkyl group with 1 to 6 carbon atoms, which can also be branched, or a hydroxyester —O—$R_3$—OH, wherein $R_3$ stands for an alkylene group with 1 to 6 carbon atoms, which can also be branched, or are selected from the group consisting of maleic acid, maleic anhydride, fumaric acid, or itaconic acid.

(Meth)acrylic acid and (meth)acrylamide may be mentioned in particular.

Besides methyl methacrylate and the polar comonomer, the poly(meth)acrylic esters P-M can also contain other monomers with Formula III different from MMA

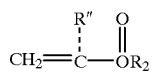

(III)

wherein
R" stands for hydrogen or methyl, and
$R_2$ stands for an alkyl group with 1 to 10 carbon atoms, which may optionally be branched, and as well stands for a cycloalkyl group with 3–7 ring members.

The monomers with Formula III are preferably C4-alkyl esters of acrylic acid or of methacrylic acid, for example isobutyl (meth)acrylate or n-butyl (meth)acrylate, or ethylhexyl methacrylate, isobornyl methacrylate, or cyclohexyl methacrylate.

Poly(meth)acrylic esters P-M with a core-shell structure are of special interest.

As a standard for the content of thermally film-forming polymers in the reactive plastisols pursuant to the invention, particularly those based on PMMA. 60–10 percent by weight might be stated, based on the total weight of Components (A)–(E), especially about 40 wt. %.

In general the molecular weight Mw of the poly(meth)acrylic esters P-M is in the range of 20,000 to 200,000, particularly 30,000 to 150,000 Daltons.

Component (B)

The monofunctional (meth)acrylate monomers RM that constitute the reactive monomeric component (B) preferably conform to Formula I

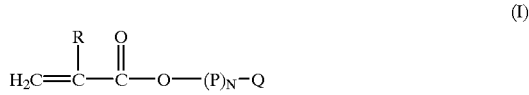

(I)

wherein R stands for hydrogen or methyl, and with

| | |
|---|---|
| n = | 0.1 to 20 |
| P = | alkylene —$(CH_2)$m-O— |
| m = | 1–6, and the alkylene group can also be branched, |
| Q = | alkyl groups with 1 to 14 carbon atoms, which can also be branched, and also: |
| | cycloalkyl, polycyclic alkyl group, |
| | aromatic group, phenyl group, |
| | substituted aromatics, |
| | aryloxy groups, |
| | heterocycle, |
| | hydrogen. |

Some that might be mentioned in particular are isobornyl methacrylate, ethylhexyl methacrylate, dicyclopentadienyloxyethyl methacrylate, benzyl methacrylate, hydroxyethyl methacrylate, hydroxypropyl methacrylate, 2-cyclohexylidene-4-methacryloyloxymethyl-1,3-dioxolane, 2,2-dimethyl-4-methacryloyloxymethyl-1,3-dioxolane, 2,2-dimethyl-5-ethyl-5-methacryloxymethyl-1,3-dioxane, 5-methacryloyloxymethyl-5-methyl-1,3-dioxane, 2-phenyl-1,3dioxolan-4-ylmethyl methacrylate, phenylethyl methacrylate, phenoxyethyl methacrylate, triethylene glycol monoethyl ether methacrylate, furfuryl methacrylate, tetrahydrofurfuryl methacrylate (cf. U.S. Pat. No. 2,680,735; BE-A 521 281).

It is appropriate to add to the formulations radical initiators corresponding to the proportion of reactive monomers (B), such as those previously described for the preparation of the poly(meth)acrylic esters P-M, in amounts of about 0.5 wt. % based on the reactive monomers (B).

The reactive plastisols pursuant to the invention can also contain known crosslinking agents as further crosslinking monomeric components (D), in amounts of 0 to 20 wt. %, preferably 0.1 to 10 wt. %, based on the thermally film-forming polymer P. Such crosslinking monomers contain several units capable of radical polymerization in the same molecule, for example such as (meth)acrylic esters of polyfunctional alcohols. Examples that may be mentioned are trimethylolpropane tri(meth)acrylate, 1,4-butanediol dimethacrylate, 1,3-butanediol dimethacrylate, and 1,6-hexanediol dimethacrylate.

Components (A) and (B) are usually present in a ratio by weight in the range of 5 to 1 to 1 to 5.

The preparation of dispersed poly(meth)acrylic ester P-M by spray-drying polymer dispersions is known in itself (cf. H. Rauch-Puntigam, Th. Völker, Acrylic and Methacrylic Compounds loc. cit. pp. 217–299; Kirk-Othmer 3rd Edition, Vol. 1, loc. cit. pp. 397–400; EP-B 0 294 663). The procedure, known in itself, is to use water (preferably distilled) as the medium, a water-soluble initiator, and an emulsifier, in addition to the monomers. Usable emulsifiers include the customary ones with an HLB value greater than 12, especially anionic emulsifiers such as the salts of long-chain paraffin sulfonic acids, for example.

In a preferred embodiment, the procedure is to add an aqueous emulsion of the monomers with initiator slowly with stirring over a given time, for example 1½ (±½) hours, to an aqueous premix with initiator/emulsifier at elevated temperature, for example about 80° C., and to complete the polymerization by maintaining the elevated temperature for about the same period of time longer. After cooling, the reaction product can be spray-dried.

Inorganic peroxides such as potassium or ammonium persulfate in amounts of 0.001 to 0.2 wt. % based on the monomers have proved to be satisfactory as initiators. Redox systems, consisting of a peroxide component and a reducing component such as a reducing salt of a sulfur-oxygen acid, for example, can also be used.

To prepare the polymer P-M, the molecular weight can be regulated by adding regulators, ordinarily sulfur regulators, particularly alkyl mercaptans such as dodecyl mercaptan or lauryl mercaptan, for example, ordinarily in amounts of about 0.05 to 0.5 wt. % based on the monomers. The molecular weight in general is in the range of 20,000 to 200,000 Daltons.

Spray-drying can also be done by known methods. On a large industrial scale, so-called spray towers are used, through which the dispersion is ordinarily sprayed in from top to bottom in parallel flow with hot air. The dispersion is sprayed through one or more nozzles, or preferably by means of a fast-rotating perforated disk. The entering hot air has a temperature of 100° C. to 250° C., preferably 150° C. to 250° C.

The discharge temperature of the air is critical for the characteristics of the spray-dried emulsion polymer, i.e. the temperature at which the dried powder granules are separated from the air stream at the base of the spray tower or in a cyclone separator. This temperature should be as far as possible below the temperature at which the emulsion polymer would sinter or melt. In many cases a discharge temperature of 50° C. to 90° C. is perfectly suitable.

With constant air flow, the discharge temperature can be regulated by varying the amount of dispersion sprayed in continuously per unit of time.

The P-M polymers obtained by spray-drying the polymer dispersions have a primary particle size in the range of 0.1 to 5 im. (Determined according to Ullmann's Encyclopedia of Industrial Chemistry, 4th Edition, Vol. 5, pp. 725–752). Particle size distribution can be determined by measuring the optical extinction of a suspension of the particles in water flowing through the measurement cell of an instrument ("Kratel Partoskop F" from Kratel GmbH, Göttingen). Secondary aggregation of the primary particles can lead to agglomerates in the size range of 5–100 $\mu$m, but they can also be used in the context of this invention.

Component (C)

Well-known plasticizers are practical as plasticizers W of Category (C), for example the alkyl esters of phthalic acid, adipic acid, or sebacic acid, chlorinated paraffins, trialkyl phosphates, aliphatic or arylaliphatic polyesters, in addition to plasticizers with moderate polarity such as higher polyglycols, phthalic polyesters, or adipic polyesters, among others. As a rule, all plasticizers suitable for PVC can also be used, with the group of phthalate plasticizers being especially prominent because of their outstanding industrial importance. There is a detailed description of suitable plasticizers in the Plastics Manual, Publisher H. K. Felger, Vol. 1/1 C, Hanser Verlag 1985, as well as in H. F. Mark et al., Encyclopedia of Polymer Science and Engineering, Supplemental Volume, pp. 568–647, J. Wiley 1989. A selection of suitable plasticizers can also be found in DE-C 25 43 542.

Benzyl octyl phthalate, diisodecyl phthalate, and dioctyl phthalate should be mentioned in particular.

The plasticizers W are generally used in proportions of 5 to 200 parts by weight based on 100 parts by weight of the thermally film-forming polymers P. The ratio between plasticizer W and the monomers of Component (B) can be chosen practically at will. Improved product properties are generally obtained even with a 10 wt. % proportion of monomer component (B). A conventional formula, for example, contains 10 parts by weight of monomer fraction (B) [including 0.5 wt. % initiator based on the content of (B)], about 40 parts by weight of thermally film-forming polymer P, and 50 parts by weight of plasticizer W.

The plastisols obtained pursuant to the invention show very good practical properties. For example, their tensile strength and the blocking resistance of the products should be emphasized. Pot lives of more than 30 days are provided. Comparison products containing 40 wt. % polymer and 60 wt. % plasticizer show very low tensile strength and a sticky surface. The ratio between plasticizer and Component (C) can be set arbitrarily.

Component (E)

Depending on the application, reactive plastisols may contain other familiar auxiliaries such as tackifiers, wetting agents, leveling agents, or propellants in proportions of 0 to 5 wt. % (based on the reactive plastisols). (Cf. Ullman's Encyclopedia of Industrial Chemistry, 5th Edition, Vol. A21, pp. 734–737 VCH 1992).

PREPARATION OF PLASTISOLS

In principle, the components for the reactive plastisols pursuant to the invention can be mixed with various types of mixers. However, in conformity with experience with PVC and PAMA plastisols, slow planetary stirrers, high-speed mixers and/or dissolvers, horizontal turbomixers, and three-roll mills are preferred, with the choice being controlled by the viscosity of the plastisols produced. (Cf. H. F. Mark et al., Encyclopedia of Polymer Science and Engineering, 2nd Edition, Vol. 17, 365–866, J. Wiley 1989). Mixing is continued until the composition has become homogeneous.

The composition can be gelled in thicknesses of 1–5 mm in the case of PAMA plastisols, preferably at temperatures of 100–200° C., in general within 30 to 2 minutes. A transparent, flexible film is obtained, as a rule.

USE OF THE PLASTISOLS

The reactive plastisols obtainable according to this invention are suitable for diverse applications, for example such as those delineated by the areas of application of PVC and PAMA plastisols: textile coatings, flexible floor coverings, undercoating, spot welding pastes.

BENEFICIAL EFFECTS

Swelling of the polymers by the reactive monomers of Group (B) is suppressed by incorporating polar comonomers according to Formula (II) in the polymers (A), for example by way of core-shell polymerization.

Component (B) shows the following advantages in particular:

In the absence of plasticizers, the monomers (B) in the polymerized state as a rule show good compatibility with the polymers (A).

The monomers (B) have a very high boiling point and no significant odor.

The following examples of embodiment illustrate the invention.

EXAMPLES OF EMBODIMENT a) Preparation Of Reactive Plastisols

Component (A)

20 g of spray-dried emulsion polymer is weighed into a vessel. The emulsion polymer has a core-shell structure with a core (weight fraction 75%) made up of 100% MMA, and a shell (weight fraction 25%) made up of 92% MMA and 8% methacrylamide.

Components (B)+(C)

| Formulation 1: | 20.00 g | Benzyl octyl phthalate |
| | 10.00 g | 2-Cyclohexylidene-4-methacryloyloxymethyl-1,3-dioxolane |
| | 0.05 g | t-Butyl perbenzoate |
| Formulation 2: | 25.00 g | Benzyl octyl phthalate |
| | 5.00 g | 2-Cyclohexylidene-4-methacryloyloxymethyl-1,3-dioxolane |
| | 0.05 g | t-Butyl perbenzoate | component (A) is mixed with the liquid formulations 12 or 2 and stirred vigorously for 2 minutes using a wooden spatula. The viscosity of the visually homogeneous paste obtained in this way increases slightly within 24 h. The level of a pourable, moderate-viscosity paste then reached is retained when stored under room temperature conditions for at least 30 days.

b) Filming Of The Reactive Plastisols

The pastes are cast both on glass plates with a thickness of about 1.5 mm and also in aluminum dishes up to a thickness of about 5 mm. Filming occurs within 20 minutes at 130° C.

Results

The gelled plastisol according to (A) plus Formulation 1 is relatively rigid and leathery-supple, as well as absolutely tack-free.

Mixture (A) plus Formulation 2 produces a likewise tack-free, somewhat softer and almost rubbery-flexible material, likewise with outstanding strength.

A comparative experiment based on a plus pure plasticizer [with no component (b)], provides an extremely soft and sticky gel with only low strength.

What is claimed is:

1. A reactive plastisol, comprising:

(A) at least one polymer P as the base polymer for the plastisol which is thermally processable into a film;

(B) a polymerizably reactive monomer comprising at least one monofunctional (meth)acrylate monomer RM of formula I

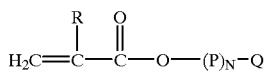

(I)

wherein R is hydrogen or methyl, n is 0.1–20, P is alkylene—$(CH_2)_m$—O—, m equals 1 to 6, the alkylene group being linear or branched, and Q is hydrogen, a linear or branched $C_{1-14}$ alkyl group, cycloalkyl, polycyclic alkyl, aromatic, substituted aromatic, aryloxy or heterocyclic;

(C) at least one low molecular weight or oligomeric plasticizer which is compatible with polymer P;

(D) a cross-linking monomer VM; and (E) at least one filler, pigment or other adjuvant.

2. The reactive plastisol of claim 1, wherein said aromatic group of substituent Q is phenyl.

3. The reactive plastisol of claim 1, wherein polymer P is a poly(meth)acrylic acid ester.

4. The reactive plastisol of claim 3, wherein said poly (meth)acrylic acid ester is polymethylmethacrylate.

5. The reactive plastisol of claim 3, wherein the poly (meth)acrylic acid ester is in the form of a spray-dried emulsion polymer when incorporated into the plastisol as an ingredient.

6. The reactive plastisol of claim 1, wherein polymer P comprises polystyrene or polystyrene copolymer.

7. The reactive plastisol of claim 6, wherein polystyrene or polystyrene copolymer is in the form of a spray-dried emulsion polymer when incorporated into the plastisol.

8. The reactive plastisol of claim 3, wherein the poly (meth)acrylic acid ester comprises up to 20 wt. % of a polar comonomer, based on the weight of the poly(meth)acrylic acid ester.

9. The reactive plastisol of claim 6, wherein the styrene copolymer comprises up to 20 wt. %, based on the weight of the copolymer, of a polar comonomer.

10. The reactive plastisol according to claim 8, wherein the polar comonomer is selected from the group consisting of (meth)acrylic acid, (meth)acrylamide, maleic acid, maleic acid anhydride, fumaric acid and itaconic acid.

11. The reactive plastisol of claim 1, wherein components (A) and (B) are present in the plastisol in a weight ratio of 1:20 to 20:1.

12. The reactive plastisol of claim 1, wherein the cross-linking monomer VM is present in the plastisol in an amount ranging from 0.1–15 wt. %.

13. The reactive plastisol of claim 1, wherein the compound of formula I is 2-cyciohexylidene-4-methacryloyloxymethyl-1,3-dioxolane.

14. The reactive plastisol of claim 1, wherein said compound of formula I is dicyclopentadienyloxyethyl methacrylate.

15. A method of protecting the underbody of a vehicle, comprising:
    applying the reactive plastisol of claim 1 to the underbody of said vehicle.

16. A method of covering floors, comprising:
    applying the plastisol of claim 1 to a floor as a covering.

17. A method of coating textiles, comprising:
    coating a textile with the reactive plastisol of claim 1.

18. A method of spot-welding, comprising:
    spot-welding a surface with the reactive plastisol of claim 1.

19. A method of coating flexible substances, comprising:
    coating the flexible substances with the reactive plastisol of claim 1.

* * * * *